ABSTRACT

United States Patent

[11] 3,587,157

[72] Inventors James E. Mundt
Mentor, Ohio;
Milan Powell, Angola, Ind.
[21] Appl. No. 684,285
[22] Filed Nov. 20, 1967
[45] Patented June 28, 1971
[73] Assignee The Weatherhead Company

[54] METHOD OF MAKING A VALVE STEM
6 Claims, 4 Drawing Figs.
[52] U.S. Cl..................................................... 29/157.1,
10/11, 29/156.7, 29/193, 72/354
[51] Int. Cl...................................................... B21d 53/00,
B21k 29/00, B23p 15/26
[50] Field of Search.......................................... 29/156.7,
157.1, 193; 72/354, 344; 10/11

[56] References Cited
UNITED STATES PATENTS
1,792,619 2/1931 Wahl............................ 29/157.1

2,621,344 12/1952 Friedman..................... 72/344
1,830,722 11/1931 Smith........................... 10/11
3,358,350 12/1967 Kubera......................... 29/156.7
3,381,352 5/1968 Linder et al. ................. 29/156.7

Primary Examiner—John F. Campbell
Assistant Examiner—Robert J. Craig
Attorney—McNenny, Farrington, Pearne & Gordon ABSTRACT: A cold forged valve stem for a three-way valve includes a conical valving portion provided by a conical skirt of work hardened material. The skirt is radially deflectable to insure proper seating and hardened to reduce wear. An oppositely facing conical valve seat is also work hardened. The valve stem is cold formed from cylindrical stock without scrap. The skirt is formed by first upsetting intermediate head and subsequently further upsetting such head while backward extruding a tubular skirt. Subsequently the tubular skirt is deformed by a conical tool to a conical shape. The opposite end of the valve stem is forward extruded to a polygonal shape to provide a wrenching portion.

INVENTORS
JAMES E. MUNDT,
MILAN POWELL
BY
McNENNY, FARRINGTON, PEARNE & GORDON
ATTORNEYS

METHOD OF MAKING A VALVE STEM

BACKGROUND OF INVENTION

This invention relates generally to valves and more particularly to a novel and improved valve stem and to a novel and improved method of forming such stem.

Valve stems of the type contemplated by this invention include one or more valve surfaces each of which is adapted to engage and provide a seal with an associated valve seat formed in a valve body. In valves incorporating valve stems of this type, a threaded connection is usually provided between the stem and body so that relative rotation therebetween moves the valve surface into and out of engagement with an associated seat for opening and closing the valve.

Generally in the past such valve stems have been formed by screw machines or the like by cutting away stock until the desired shape and finish is obtained. When such valve stems are formed by machining a considerable amount of scrap results. Further the machining time required to produce such stems is relatively high so the cost of producing the stems is substantial.

SUMMARY OF INVENTION

The present invention provides a novel and improved method of manufacturing valve stems without scrap by cold forging such stems from cylindrical blanks. Because all scrap is eliminated and because high production forging machines may be employed for their manufacture, the manufacturing costs of the valve stems is drastically reduced. For example, the cost of manufacturing the illustrated valve stem in accordance with the method of this invention is about one-fourth the cost of manufacturing a comparable valve stem on a screw machine or the like.

The valve stem in accordance with this invention is also superior to conventional valve stems. In the illustrated embodiment, a conical valving surface is provided by a tubular skirt which is radially resilient. Therefore, proper seating is achieved even when the valve seat is slightly out of round or when slight eccentricity exists between the valve seat and the valving surface of the stem. Further the grain structure of the metal forming the valve stem particularly in the area of the conical valving surface extends axially to provide improved strength without materially reducing the radial deflectability of such surface. Still further the valving surface is work hardened to a considerable degree so that the valving surface of the valve stem remains smooth and undamaged for longer periods of use.

OBJECTS OF INVENTION

It is an important object to provide a novel and improved valve stem having a valving surface provided by a radially resilient tubular skirt.

It is another important object of this invention to provide a novel and improved cold forged valve stem having opposed valving surfaces each adapted to seat against an associated valve seat.

It is still another object of this invention to provide a novel and improved method of cold forming valve stems wherein at least one valving surface is provided by a tubular skirt.

Further objects and advantages will appear from the following description and drawings wherein.

Figure 1:
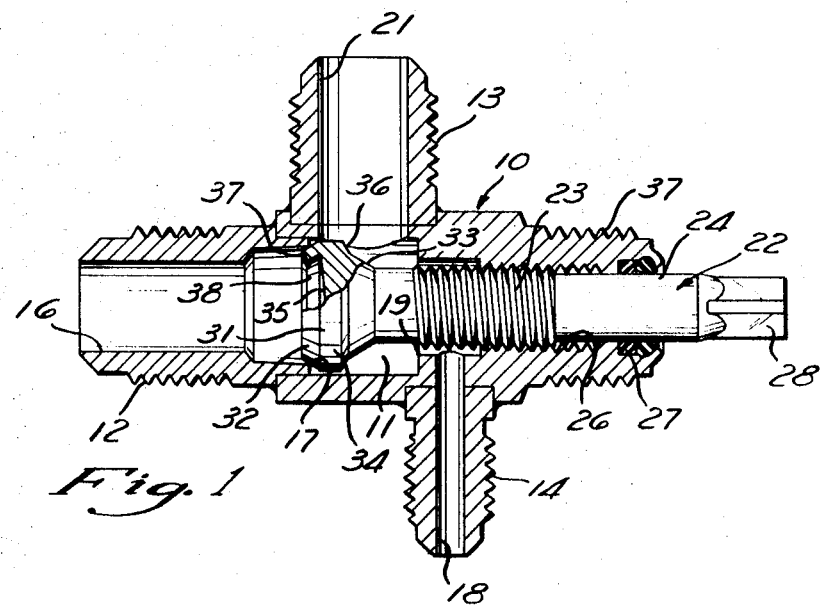
FIG. 1 is a side elevation of a longitudinal section of a typical three-way valve provided with a valve stem in accordance with this invention.

FIG. 1 illustrates a typical three-way valve incorporating a valve stem in accordance with this invention. This valve is the type disclosed in the Crawley U.S. Pat. No. 2,536,727. The valve includes a body assembly 10 provided with a main valve chamber 11. The body assembly 10 is provided with three threaded connector portions 12, 13, and 14. The passage 16 in the connector portion 12 communicates with the main chamber 11 through a valve seat 17. The passage 18 communicates with the main chamber 11 through a second valve seat 19 and the passage 21 within the connector portion 13 communicates directly with the main chamber 11.

A valve stem 22 is provided with an elongated shank including a threaded portion 23, a smooth cylindrical portion 24, and a polygonal wrenching portion 28. The threaded portion 23 mates with internal threads 26 on the body assembly 10 so that relative rotation between the stem and the body produces relative axial movement. A seal assembly 27 in the body assembly 10 engages the cylindrical portion 24 to provide a fluidtight seal therebetween.

A head portion 31 is provided at the end of the valve stem opposite the wrenching portion 28. The head portion includes a first conical valving surface 32 adapted to seat against and seal with the seat 17 and a second oppositely facing valving surface 33 adapted to engage and seal with the valve seat 19. A cylindrical portion 34 extends from the conical valving portion 32 to a conical shoulder 36 which in turn joins the cylindrical portion 34 and the conical valving surface 33.

The valving surface 32 is provided by a conical skirt 37 of substantially uniform thickness which extends from an end face 35 of a central recess 38 in the end of the valve stem. The skirt is relatively thin so it is radially resilient and can deflect radially inward to insure proper seating. This resiliency provides proper seating of the valve even when the valve seat is slightly out of round and when a slight amount of eccentricity exists between the valving surface 32 and the valve seat 17.

In the particular valve illustrated, the valve stem 22 is movable between the extended position illustrated in FIG. 1 with the valving surface 32 engaging the valve seat 17 and a retracted position in which the valving surface 33 engages the valve seat 19. When the valve is in the illustrated extended position, the passages 18 and 21 are connected while the passage 16 is isolated therefrom. When the valve stem is in the retracted position, seating against the valve seat 19, the two passages 16 and 21 are connected while the passage 18 is isolated therefrom. Such a valve has many applications and is often used in refrigerating systems or the like. External threads 37 are provided so that a cover element (not illustrated) may be threaded onto the body to protect the end of the valve stem.

Figure 3:
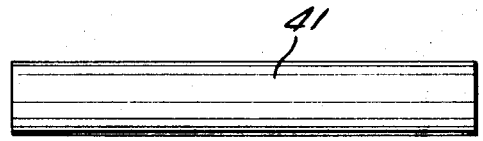
FIG. 3 is a side elevation of the blank used to form the valve stem of FIG. 2.
Figure 4:
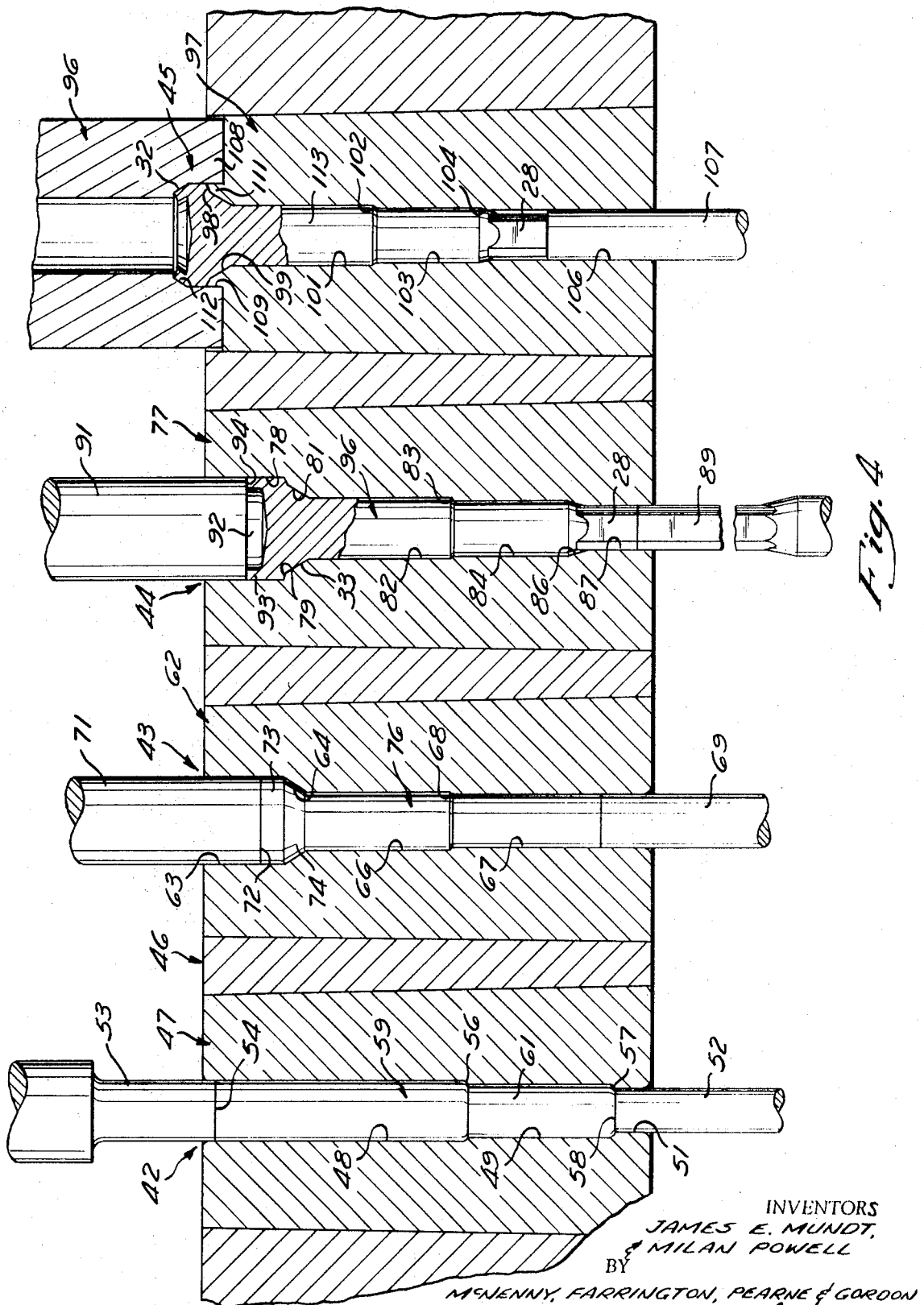
FIG. 4 is a longitudinal section illustrating the tools and dies for progressively deforming the blank of FIG. 3 to the required shape of the valve stem blank.

The valve stem 22 may be manufactured from a cylindrical blank 41 illustrated in FIG. 3 by progressive cold forging in the manner illustrated in FIG. 4 and by subsequent thread rolling operation which is not illustrated. The progressive forming illustrated in FIG. 4 employs four progressive forming operations which may be performed in four stations of a progressive header or the like. Such a forging machine is usually provided with an automatic transfer (not illustrated) which progressively transfers the blank to each of the die stations 42, 43, 44 and 45.

Dies are mounted in a die breast 46 at each of the die stations and associated tools and knockouts cooperate therewith to progressively work the blank. At the first working station 42, the die 47 is provided with an axial first bore 48 having a diameter substantially equal to the diameter of the blank 41, and which extends to a second coaxial bore 49 having a diameter substantially equal to the diameter of the cylindrical portion 24 of the final valve stem. Beyond the second bore 49 is still a third coaxial and smaller diameter bore 51 which is closely fitted by a knockout tool 52.

A tool 53, carried by a header slide (not illustrated), is provided with a cylindrical portion closely fitting the first bore 48 and a smooth end face 54. An extrusion throat 56 is provided in the junction between the two bores 48 and 49. The die is also provided with a rounded section 57 adjacent to the end 58 of the knockout pin 52.

As the tool 53 moves to the forward dead center position illustrated in FIG. 4, the blank 44 is pressed into the die along the bores 48 and 49 until its end engages the knockout 52. At the completion of the first working stroke, a first intermediate blank 59 is formed which has a forward extruded reduced diameter section 61 and square end faces. After the completion of the first working stroke at the first die station 42, the knockout pin ejects the blank 59 and it is transferred to the second die station 43. The extrusion of the portion 61 insures that the cylindrical section 24 of the final valve stem has a good surface finish and is accurately sized to properly mate with the seals 27.

A die 62, located at the second die station 43, is formed with a first bore 63 which extends in from the die face to a conical section 64 joining the first bore 63 and a second bore 66. The second bore 66 is joined to a third bore 67 by a conical transition section 68. The second bore 66 is substantially the same diameter as the bore 48 in the die 47 and the third bore 67 is substantially the same diameter as the bore 49 in the die 47 so substantially no working of the blank occurs within the two bores 66 and 67 at the second die station 43.

A knockout pin 69 extends into the bore 67 to limit inward movement of the blank during the working stroke at the second die station 43. A tool or punch 71, provided with a flat end face 72, is proportioned to closely fit the first bore 63. As the tool 71 approaches the forward dead center position illustrated in FIG. 4, the end of the blank 59 is upset to form a head portion having a cylindrical section 73 and a conical section 74. At the same time the shoulder between the extruded portion 61 of the blank 59 is reworked to a conical shape.

After the punch 71 withdraws, the ejector pin 69 ejects the second intermediate blank 76 from the die 62 and it is transferred to the third die station 44. At the third die station 44 a die 77 is provided which includes a first bore 78 of a diameter larger than the cylindrical portion 73, a conical shoulder 79, and a conical section 81 of substantially the same shape and size as the conical section 64. Extending inwardly from the conical section 81 is a second bore 82 having a diameter and length substantially equal to the diameter and length of the bore 66 in the die 62 and a shoulder 83, similar in size and shape to the shoulder 68. A third bore 84, having a diameter substantially equal to the third bore 67 of the die 62, extends from the shoulder 83. However, at the inner end of the third bore 84 the die 77 is formed with a conical transition portion 86 which joins the bore 84 with a polygonal shaped opening 87 shaped to form the wrenching portion 28.

A knockout pin 89 extends into the polygonal section 87 and closely fits the surface thereof. A punch of tool 91 is proportioned to closely fit the first bore 78 and is provided with a reduced diameter nose 92 having a diameter greater than the diameter of the cylindrical portion 73 of the second intermediate blank 76 and less than the diameter of the first bore 78.

As the punch 91 enters the die the inner end of the second intermediate blank 76 is forward extruded to form the wrenching portion 28 and the cylindrical portion 73 of the second intermediate blank 76 is further upset to the diameter of the first bore 78 and a tubular skirt 93 is backward extruded around the nose 92 to the shoulder 94 on the punch 91. This backward extrusion of the skirt 73 causes the grain structure of the material formed in the skirt to be substantially axial and substantially increases the hardness of the material forming the skirt. The wrenching portion 28 is also worked hardened to a substantial degree and is joined to the cylindrical portion by a conical section free of sharp corners which would tend to produce stress concentration. Therefore, the wrenching portion can sustain substantial forces without damage. At the completion of the working in the third die station 44, the third intermediate blank 96 is produced. Since the conical section 81 is substantially the same shape as the conical section 64, substantially no working occurs in the zone of the valving portion 43 and the reworking insures that the valving portion 33 is accurately shaped to the final shape required.

After the punch 91 retracts, the knockout pin ejects the third intermediate blank 96 from the die 77 and it is transferred to the fourth and final die station 45. At the final die station 45 the tubular skirt 93 is deflected inwardly by a tool 96. At this die station a die 97 is provided with a conical shoulder 98 similar in shape to the shoulder 79 in the die 97, a second conical portion 99 similar in shape to the conical section 81, and a first bore 101 similar in shape and length to the bore 82. Extending inwardly from the bore 101 and from a shoulder 102 is a second bore 103 having a diameter and length similar to the bore 84 of the die 77. A conical section 104 joins the bore 103 to a third bore 106 is proportioned to receive the wrenching section 28. Since the only working occurring at the last die station 45 is the radial deflection of the skirt, only light forces are applied and it is not necessary to form a mating shape around the wrenching portion 28.

A knockout pin 107 is positioned in the bore 106 to engage the end of the blank. The tool 96 is provided with a tubular end 108 around a bore 109 which fits around the projection 111 on the die 97 and has a diameter substantially equal to the diameter of the headed portion formed in the first bore 78 of the die 77. The tool 96 is also provided with a conical portion 112 shaped to provide the valving section 32 of the final blank.

Figures 2, 2A:
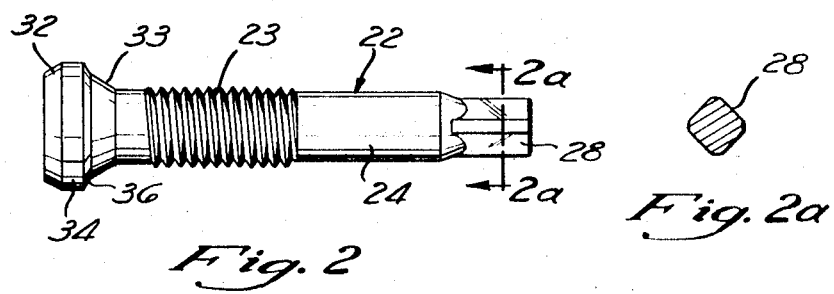
FIG. 2 is a side elevation of the valve stem illustrated in FIG. 1.
FIG. 2a is a cross section taken along 2—2 of FIG. 2.

As the tool 96 approaches the forward dead center illustrated in FIG. 4, the skirt 93 is deformed radially inward to a conical shape to form the valving section 32. After the tool 96 retracts, the knockout pin 107 ejects the finished blank 113 from the die 97. This blank, excepting for the formation of the threads, is the final blank having a shape of the valve stem 22. The threads 23 are then rolled on the blank to finish the valve stem structure illustrated in FIGS. 2 and 2a. There is no scrap whatsoever in the formation of the valve stem and the two valving sections 32 and 33 are work hardened to provide the improved wearing characteristics of the valve stem. The provision of a recess within the valving section 32 provides resiliency to improve seating and sealing with the valve seat 17. The threaded portions 12, 13, and 14 of the body assembly may in some instances be brazed in place. When the valve stem is positioned in the body assembly during brazing some annealing usually occurs. However, the elongated grain structure remains to provide improved toughness and also some work hardening usually remains.

Although a preferred embodiment of this invention is illustrated, it is to be understood that various modifications and rearrangements of parts may be resorted to without departing from the scope of the invention disclosed and claimed herein.

We claim:

1. A method of cold forming a valve stem or the like comprising backward extruding one end of a blank to form a cylindrical skirt of substantially uniform wall thickness and with substantially cylindrical inner and outer surfaces, said skirt extending axially of the blank from a central end face to an open end, and thereafter radially deforming said wall without substantially changing the wall thickness with the greatest radial deformation at the open end of said skirt remote from said end face and progressively less radial deformation from said end of said skirt toward said end face to provide a first flaring valving surface of circular section along said skirt adapted to seal with a mating valve seat.

2. A method as set forth in claim 1 wherein said end of said skirt is radially deformed inwardly.

3. A method as set forth in claim 2 wherein said skirt is deformed until said flaring valving surface is conical.

4. A method as set forth in claim 1 wherein said end of said blank is first upset to form a head, and said head is further worked to form said tubular skirt.

5. A method as set forth in claim 4 wherein said head is formed with a second valving surface on the side of said head opposite said skirt which is also adapted to seal with an associated valve seat.

6. A method as set forth in claim 5 wherein said valve is cold formed from cylindrical stock by first forward extruding a first portion to a reduced diameter to form a first intermediate blank, and first intermediate blank is further worked to extrude the end of said first portion to a noncircular shape and said one end is upset to form said head, said head is subsequently further upset and simultaneously backward extruded to form said skirt.